(12) United States Patent
Aigner et al.

(10) Patent No.: US 7,467,455 B2
(45) Date of Patent: Dec. 23, 2008

(54) METHOD OF FIXING COMPONENTS

(75) Inventors: Ali Aigner, Stuttgart (DE); Hermann Otte, Varel (DE)

(73) Assignee: Decoma (Germany) GmbH, Sulzbach (DE)

( * ) Notice: Subject to any disclaimer, the term of this patent is extended or adjusted under 35 U.S.C. 154(b) by 0 days.

(21) Appl. No.: 11/644,513

(22) Filed: Dec. 22, 2006

(65) Prior Publication Data

US 2007/0137018 A1 Jun. 21, 2007

Related U.S. Application Data

(62) Division of application No. 10/397,558, filed on Mar. 27, 2003, now abandoned.

(30) Foreign Application Priority Data

Mar. 26, 2002 (DE) ................................ 102 13 551

(51) Int. Cl.
   *B23P 11/02* (2006.01)
(52) U.S. Cl. ........................................... 29/453; 29/449
(58) Field of Classification Search .................. 29/453, 29/448, 449, 428, 464; 403/329
   See application file for complete search history.

(56) References Cited

U.S. PATENT DOCUMENTS

| 4,261,151 A | | 4/1981 | Ito | |
| 5,776,039 A | * | 7/1998 | Perez, Jr. | ..................... 482/97 |
| 6,328,358 B1 | * | 12/2001 | Berweiler | ................... 293/115 |

FOREIGN PATENT DOCUMENTS

| DE | 29 14 317 A1 | 9/1979 |
| DE | 199 59 454 A1 | 9/1999 |

* cited by examiner

*Primary Examiner*—John C Hong
(74) *Attorney, Agent, or Firm*—Clark Hill PLC

(57) ABSTRACT

A method of fixing a first component to a second component. The method includes the step of arranging the first component adjacent the second component. Aligning a tab of the first component for selective engagement with a tongue of the second component. Sliding the first component longitudinally against the second component. Flexing the tongue of the second component by sliding the tab of the first component longitudinally along a conical projection of the second component. Overlapping the tongue and the tab until the conical projection is axially aligned with and matingly received and retained in a conical hole in a direction generally orthogonal to the longitudinal sliding movement thereby selectively fixing the first component to the second component.

5 Claims, 5 Drawing Sheets

METHOD OF FIXING COMPONENTS

RELATED APPLICATIONS

This application is a divisional application of U.S. application Ser. No. 10,397,558 filed on Mar. 27, 2003 now abandoned.

BACKGROUND OF THE INVENTION

1. Field of Invention

The present invention relates to a fixing system for fixing a first component to a second component.

2. Description of the Related Art

In the field of automobile construction, in particular, there is frequently a need to fix individual components to one another. Examples include interior cladding sections which are to be mounted on corresponding support members of the bodywork. Another example is the exterior mounting of decorative strips on the vehicle bodywork.

It is also necessary from time to time to fix components to the radiator grille of a motor vehicle. Thus, for example, it is known to fix a so-called distance control plate or ART plate to a radiator grille within the scope of distance sensing and regulating technology (German: Abstands-Regel-Technik, ART or distance-control-technology). Previous fixing systems have used resilient steel discs which co-operate with correspondingly formed projections. A fixing system of this kind has proved to be relatively expensive to produce and unreliable. Moreover there is a relatively high number of rejects.

SUMMARY OF THE INVENTION

It is desirable to overcome these problems by providing a simple, cheaply produced and reliable fixing system particularly for securing motor vehicle components to one another.

The fixing system according to the invention can be produced easily and cheaply and has proved to be robust and reliable in practice. Using the system according to the invention it is possible to clip plastic components together with virtually no play and in such a way as to maintain pre-stressing. As the system merely comprises components which are to be formed on the components to be fixed to one another, no additional fixing elements are required. The system according to the invention can be produced to a very high quality as production is well controlled and can be mounted and dismantled several times. The system according to the invention provides the same operational reliability as conventional known systems while making mounting and dismantling easier.

According to a first preferred embodiment of the system according to the invention, two, three, four or more tabs are formed on the first component to be secured, engaging with a corresponding number of tongues provided on the second component. By matching the number of tabs and tongues which are to engage with one another the fixing system according to the invention can easily be adapted to the size or mass of the components which are to be fixed together.

It has proved advantageous to construct the tongue as a resilient tongue, particularly of plastics. By providing resilient tongues of this kind the system according to the invention can be mounted or dismantled particularly easily.

By these measures it is advantageously possible to form the tabs and tongues integrally with the respective components. This lowers the manufacturing costs and the number of components can be reduced compared with conventional solutions. The tabs are appropriately also made of plastics.

According to a particularly preferred embodiment of the fixing system according to the invention the ends of the conical projections provided on the tongues are in the form of sectors of a circle or semicircles. Such a "dome-like" configuration of the ends of the conical projections confers advantages in connection with the centring of the components which are to be fixed to one another.

According to another preferred embodiment of the fixing system according to the invention, the first component is a radiator grille, and the second component is a plate to be fixed to the radiator grill, particularly a distance control plate. These two components can be securely fixed to one another cheaply and easily by means of the fixing system according to the invention.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
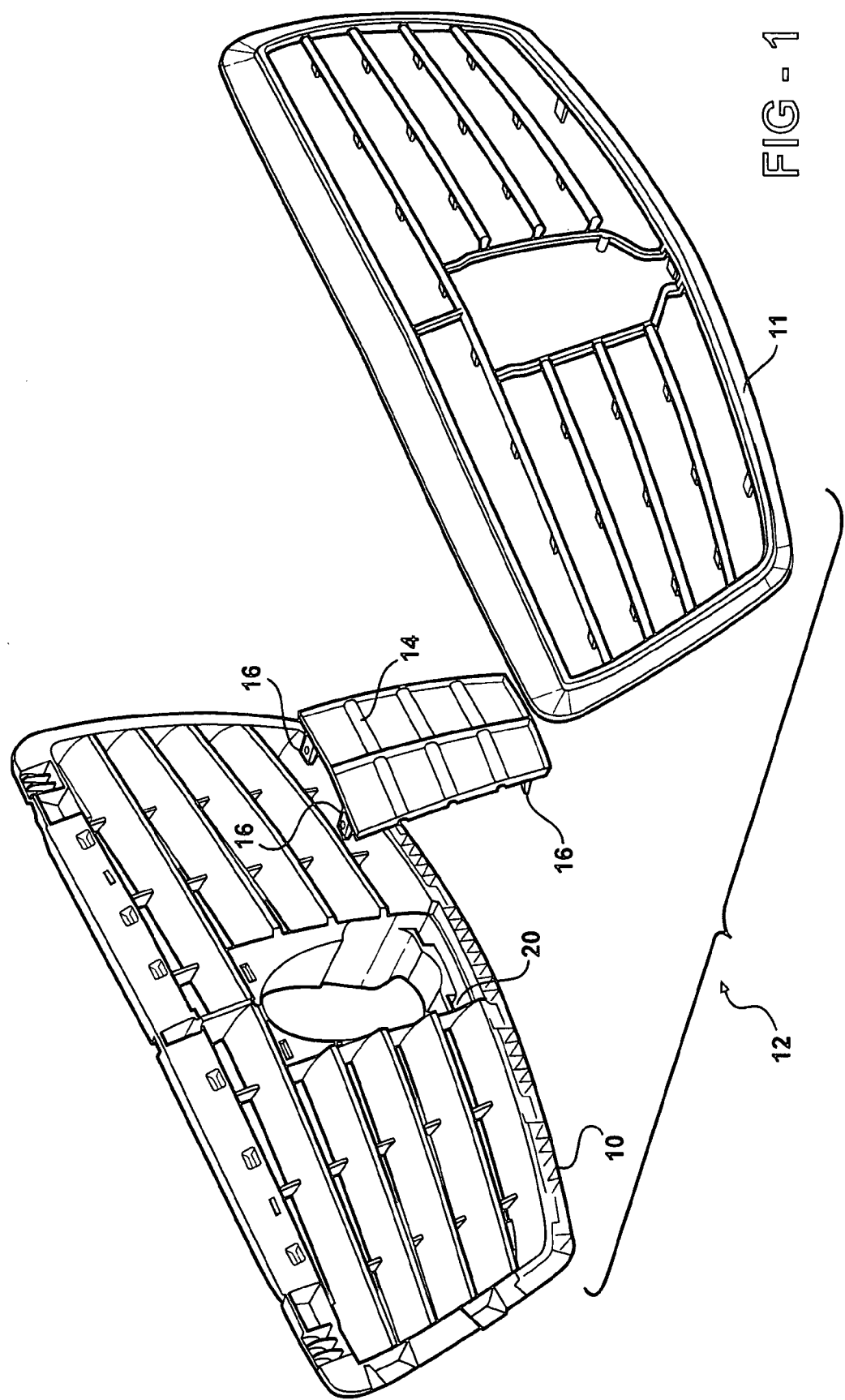
FIG. 1 is a perspective view of radiator grille components and a distance control plate which can be fixed to one another using the fixing system according to the invention.

In FIG. 1, a radiator grille including a plurality of components 10, 11 and 14 is generally designated at 12. The component 10 of the radiator grille 12 is a radiator mesh while component 11 is a frame. The component 14 is a distance control plate 14, to be used within the scope of a distance regulating or control device, is to be fixed to the radiator mesh 10

It should be pointed out that it is possible to secure the components 10 and 11 to one another first and then to fix the distance control plate 14 to the radiator grille thus formed, using the system according to the invention.

However, in the interests of simplicity and by way of example, it will be assumed here that the distance control plate 14 is first fixed to the radiator mesh 10 and then the frame 11 is mounted on the components 10, 14 fixed to one another.

Figure 2:
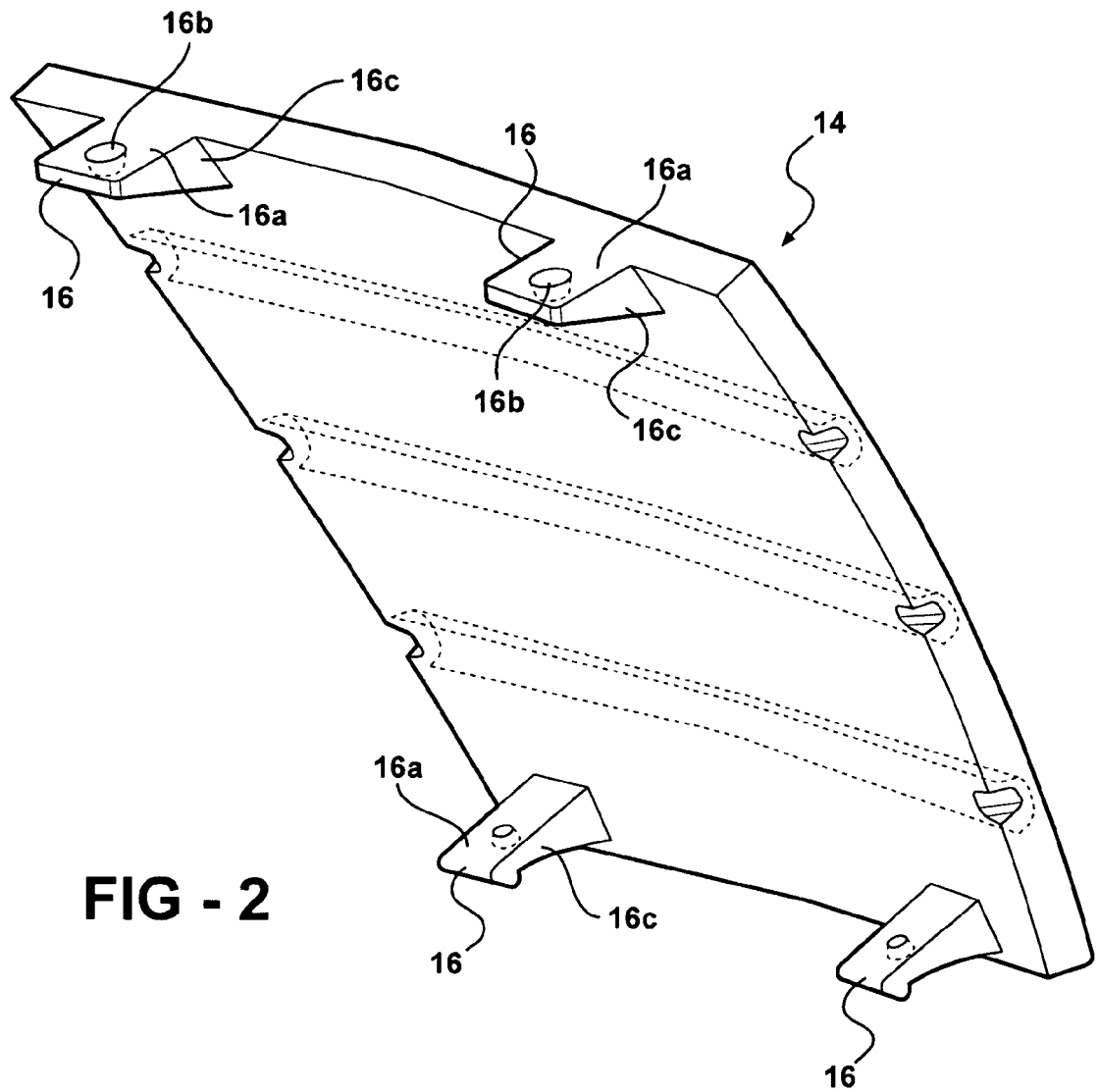
FIG. 2 is a detailed perspective view of the distance control plate according to FIG. 1.

The distance control plate 14 is constructed with four tabs 16 which are also clearly shown in FIG. 2. The tabs 16 each have a substantially planar flat area or surface 16a extending substantially perpendicular to the main direction of the distance control plate and containing tapering conical recesses 16b. The recesses in the upper tabs 16 taper downwards while those in the lower tabs 16 taper upwards. In addition, the tabs have diagonally extending reinforcing webs 16c for supporting and reinforcing the surfaces 16a.

Figure 3:
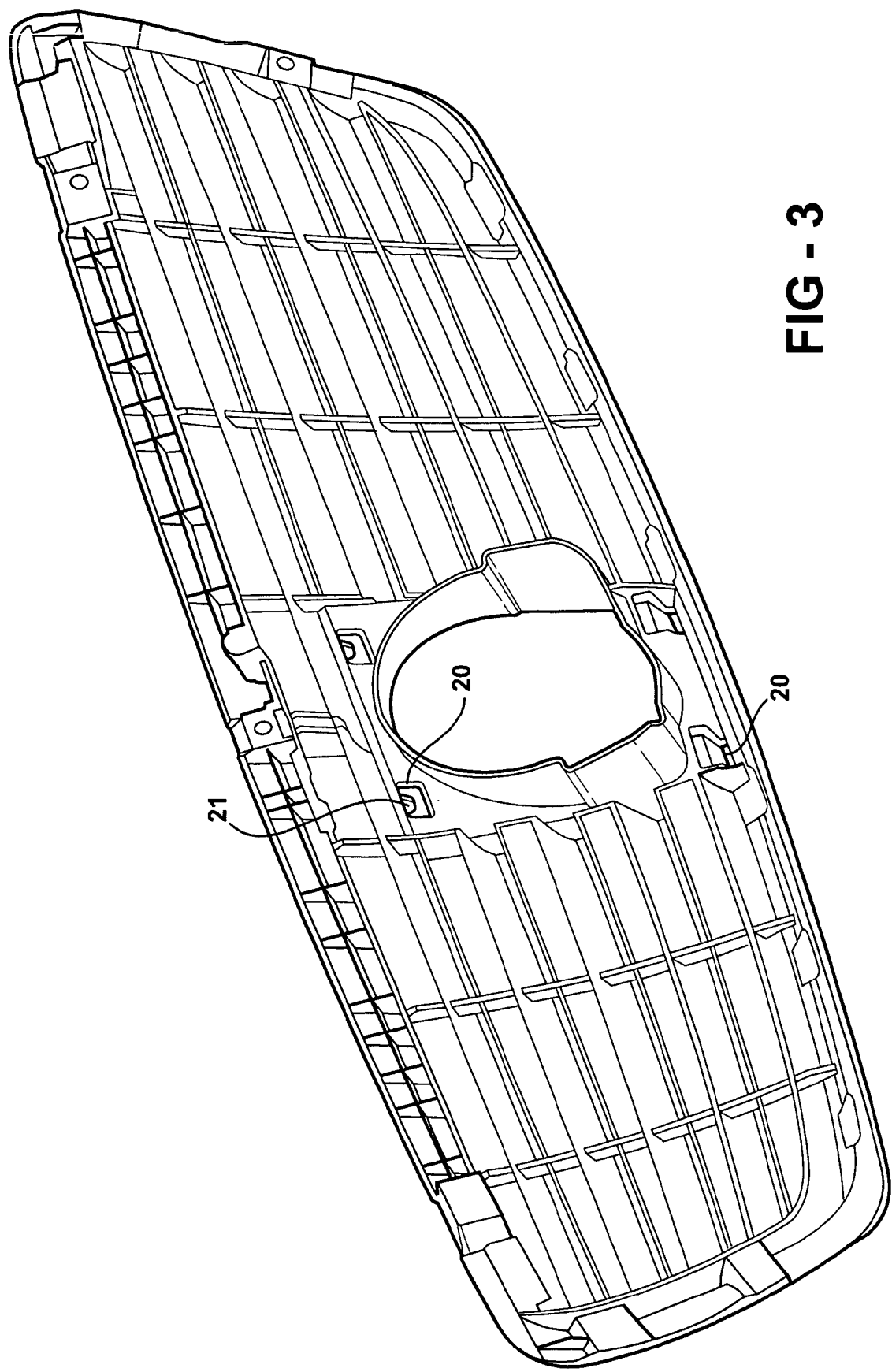
FIG. 3 is a perspective rear view of the radiator grille according to FIG. 1.
Figure 4:
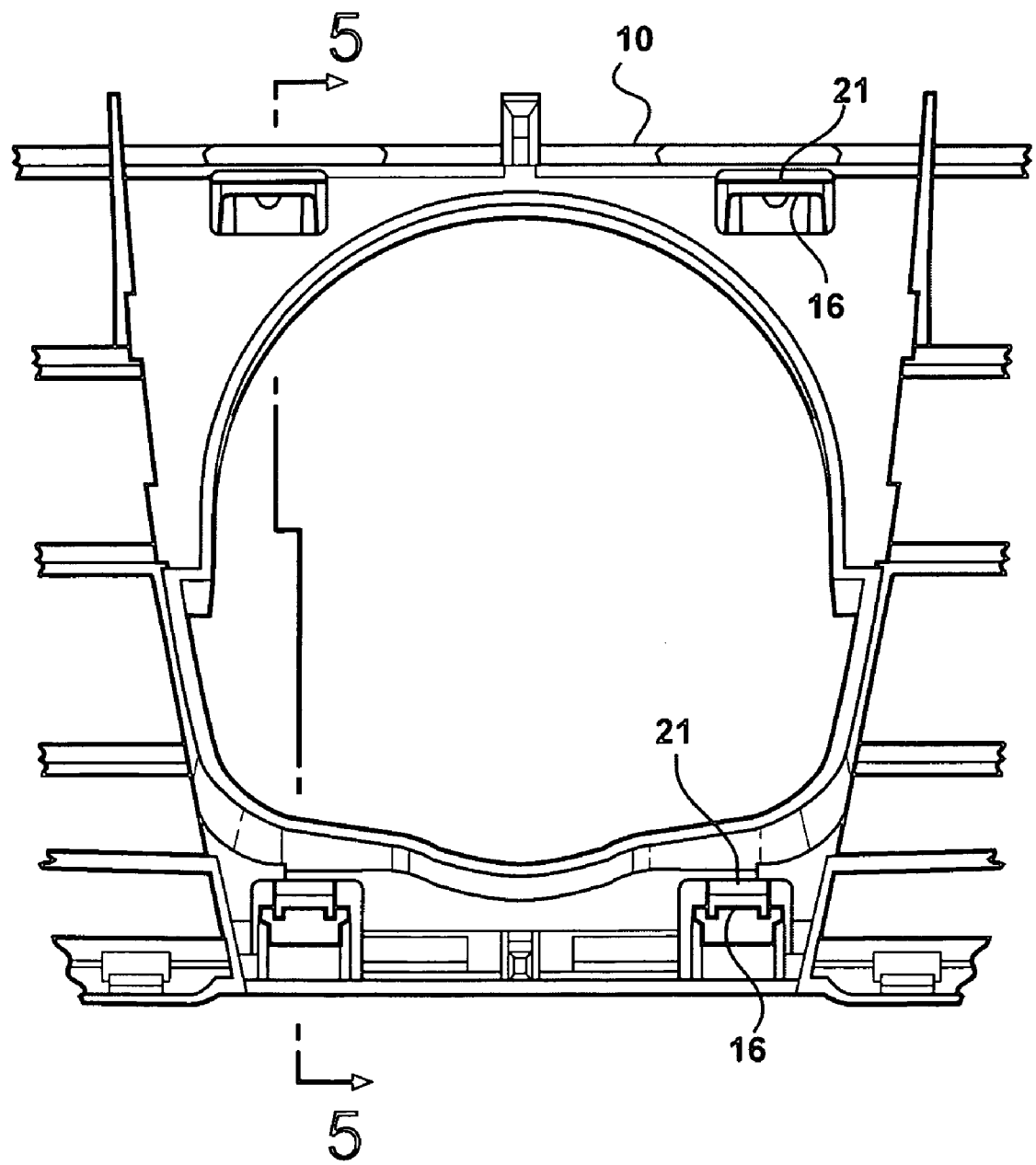
FIG. 4 is an enlarged front view of the central part of the radiator grille.
Figure 5:
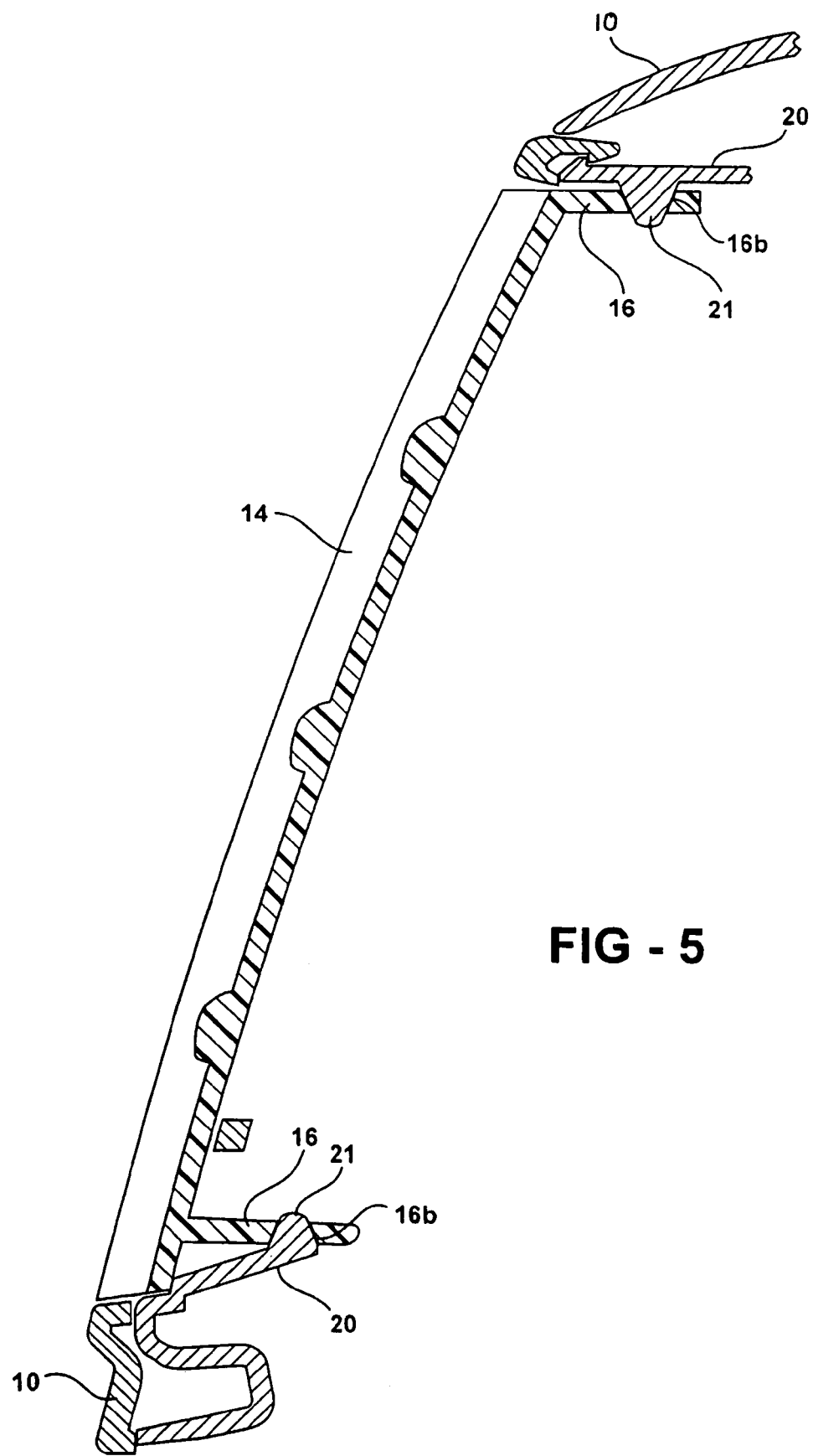
FIG. 5 is a cross-sectional view taken along line 5-5 of FIG. 4.

As can be seen especially from FIGS. 3 and 5, the radiator mesh 10 has in particular resiliently constructed plastics tongues 20 each of which has a conical spike 21. The dimensions and shape of the spikes 21 are such that they are able to be received and engaged in the recesses 16b in the tabs 16 on the distance control plate 14. Thus, the spikes 21 on the upper tongues 20 taper downwards while those on the lower tongues taper upwards.

The conical spikes 21 engage in the recesses 16b in the manner of the conical clamping principle as used in rotary engines, for example.

FIG. 5 in particular shows that the upper conical spikes 21 engage in the correspondingly conical recesses 16b from above and the lower conical spikes 21 engage therein from below. More specifically, referring to FIGS. 1 and 5, as the control plate 14 is pressed into the opening provided in radiator mesh 10, the leading edge of the flat surface 16a of the plurality of tabs 16 engages the conical spike 21 of the corresponding tongue 20 on the mesh 10. The conical shape of the spikes 21 allows the tabs 16 to ride along the spike 21 and flex the resilient tongue 20 until the spike 21 is received in the corresponding conical recess 16b in the tab 16. The mating conical shapes of the spikes 21 and recesses 16b receive and retain the tongue 20 connected to the tab 16 and thus fixedly secure the control plate 14 to the mesh 10. The frame 11 may then be connected to the grille 12 is a similar manner of attachment.

As a result of the resilient engagement thus provided between the conical spikes 21 and the recesses 16b, the distance control plate 14 is securely fixed to the radiator grille mesh 10.

It should be pointed out that, even though it is not specifically shown, the frame 11 may also be fixed to the radiator mesh 10 by means of the fixing system according to the invention.

Both the radiator grille components 10, 11 and the distance control plate 14 are expediently made of plastics. Thus, the tongues 20 and tabs 16 which lock these components to one another can easily be made integral with the respective components. The fixing system according to the invention is beneficial, for example, in that due to the resilient locking of the plastics elements with one another, there is no material fatigue such as would occur with conventional attachments using metal brackets.

The invention has been described in an illustrative manner, and it is to be understood that the terminology, which has been used, is intended to be in the nature of words of description rather than of limitation.

Many modifications and variations of the present invention are possible in light of the above teachings. It is, therefore, to be understood that within the scope of the appended claims, the invention may be practised other than as specifically described.

What is claimed is:

1. A method of fixing a first component to a second component wherein the first component includes at least one tab integrally formed thereon and at least one tapering conical hole extending through the tab and the second component includes at least one tongue integrally formed thereon and a tapering conical projection formed integrally on and projecting from the tongue, said method including the steps of:

arranging the first component adjacent the second component;

aligning the tab of the first component for selective engagement with the tongue of the second component;

sliding the first component longitudinally against the second component;

flexing the tongue of the second component by sliding the tab of the first component longitudinally against the projection of the second component; and overlapping the tongue and the tab until the conical projection is axially aligned with and matingly received and retained in the conical hole in a direction generally orthogonal to the longitudinal sliding movement thereby selectively fixing the first component to the second component.

2. A method as set forth in claim 1 wherein the conical projection tapers from the tongue to a dome-shaped distal end wherein the diameter of the projection at the tongue is greater than the diameter of the dome-shaped distal end and wherein said longitudinal sliding movement between the tab and the tongue further includes the step of aligning the dome-shaped distal end of the projection with the tapering conical hole to facilitate corresponding mating engagement between the projection and the hole and automatically fixing the first component to the second component.

3. A method of fixing a distance control plate to a radiator grille wherein the distance control plate includes a plurality of tabs integrally formed thereon and a tapering conical hole extending through each of the tabs and the radiator grille includes a corresponding plurality of tongues integrally formed thereon and a tapering conical projection formed integrally on and projecting from each of the tongues, said method including the steps of:

arranging the distance control plate adjacent the radiator grille;

aligning the tabs of the distance control plate for selective engagement with the tongues of the radiator grille;

sliding the distance control plate longitudinally against the radiator grille;

flexing the tongues of the radiator grille by sliding the tabs of the distance control plate longitudinally against the projections of the radiator grille; and overlapping the tongues and the tabs until the conical projections are axially aligned with and matingly received and retained in the conical holes in a direction generally orthogonal to the longitudinal sliding movement thereby selectively fixing the distance control plate to the radiator grille.

4. A method as set forth in claim 3 further including the step of flexing the tongues of the radiator grille by engaging and sliding the tabs of the distance control plate longitudinally along the projections of the radiator grille and biasing the projections into continuous contact with the tabs until the projections are axially aligned with the conical holes wherein said biasing automatically extends the projections matingly into the conical holes in a direction orthogonal to the longitudinal sliding movement thereby fixing the distance control plate to the radiator grille.

5. A method of fixing a first component to a second component wherein the first component includes at least one tab integrally formed thereon and at least one tapering conical hole extending through the tab and the second component includes at least one tongue integrally formed thereon and a tapering conical projection formed integrally on and projecting from the tongue, said method including the steps of:

arranging the first component adjacent the second component;

aligning the tab of the first component for selective engagement with the tongue of the second component;

sliding the first component longitudinally against the second component;

flexing the tongue of the second component in a direction generally orthogonal to the longitudinal sliding movement of the first component by sliding the tab of the first component longitudinally against the projection of the second component; and overlapping the tongue and the tab until the conical projection is axially aligned with and engages the conical hole in the direction generally orthogonal to the longitudinal sliding movement of the first component whereby the engagement of the conical projection with the conical hole fixedly secures the first component to the second component.

\* \* \* \* \*